United States Patent [19]

Janeke

[11] Patent Number: 4,974,973
[45] Date of Patent: Dec. 4, 1990

[54] BEARING SLEEVE
[75] Inventor: Rolf G. Janeke, Huskvarna, Sweden
[73] Assignee: Aktiebolaget Electrolux, Stockholm, Sweden
[21] Appl. No.: 472,758
[22] Filed: Jan. 31, 1990
[30] Foreign Application Priority Data
Aug. 31, 1989 [SE] Sweden .............................. 8902889
[51] Int. Cl.⁵ ..................... F16C 33/76; F16C 27/06
[52] U.S. Cl. ................................. 384/484; 384/477; 384/536
[58] Field of Search ............ 384/477, 484, 486, 489, 384/457, 536; 277/37, 153

[56] References Cited
U.S. PATENT DOCUMENTS

| 2,173,250 | 9/1939 | Fay | 384/536 |
| 3,415,500 | 12/1968 | Pethis | 384/536 X |
| 4,611,931 | 9/1986 | Brandenstein et al. | 384/477 |
| 4,652,152 | 3/1987 | Brandenstein et al. | 384/536 X |
| 4,872,770 | 10/1989 | Dickinson | 384/477 X |

FOREIGN PATENT DOCUMENTS 3304397  8/1984  Fed. Rep. of Germany ...... 384/484

Primary Examiner—Thomas R. Hannon
Attorney, Agent, or Firm—Pearne, Gordon, McCoy & Granger

[57] ABSTRACT

A separate crankshaft bearing sleeve which in situ surrounds the crankshaft bearings in a combustion engine. The sleeve consists of a ring-shaped part as well as a disc-shaped part (22, 21). The ring-shaped part encircles the roller bearing (17) in the bearing seat in the crankcase end wall and the disc-shaped part incorporates a sealing ring (25) with lips (26, 27) sealingly engaging the crankshaft.

5 Claims, 1 Drawing Sheet

BEARING SLEEVE

BACKGROUND OF THE INVENTION

The present invention relates in general to bearing structures for supporting rotatable parts and more particularly to a crankshaft bearing sleeve of a two-stroke engine with crankcase compression.

PRIOR ART

In the development of light combustion engines for chainsaws, grass trimmers, and the like, bearing sleeves have been used to eliminate the need to machine-cut the bearing seats in the crankcase. A device involving such an improvement is taught by Swedish Patent Publication 435418, which shows a separate crankshaft bearing band separating the cylinder from the bottom part of the crankcase in the parting plane. The teachings of Swedish Patent Publication 435418 are incorporated herein by reference in their entirety.

SUMMARY OF THE INVENTION

In accordance with the present invention, a bearing sleeve for the crankshaft of a two-stroke engine with crankcase compression and roller bearings in the crankcase end walls is provided. The bearing sleeve is provided with a ring-shaped part forming a band around the roller bearing and in situ fastened in the bearing seats of the crankcase end walls. The outside of the ring-shaped part is coated with an elastic material. A disc-shaped part of the sleeve has a center hole in which a sealing ring is mounted so as to sealingly engage the crankshaft.

The present invention provides the following advantages:

(1) Reduces the cost for machining the bearing seats;
(2) Facilitates sealing between the cylinder and the crankcase;
(3) Reduces the vibration and noise by means of an elastic installation of the crankshaft bearings in the crankcase;
(4) Compensates for irregular tolerances in the castings, etc; and
(5) Effects a seal against the crankshaft.

In its practical embodiment, the present invention can be a tin cup with a rubber-coated outer periphery and an internal periphery provided with a sealing ring.

These and other advantages may be gained when the present invention is practiced in accordance with the following description and claims.

A preferred embodiment of a bearing sleeve according to the present invention is described in the following specification with reference to the attached drawings.

DESCRIPTION OF THE PREFERRED EMBODIMENT

Figure 1:
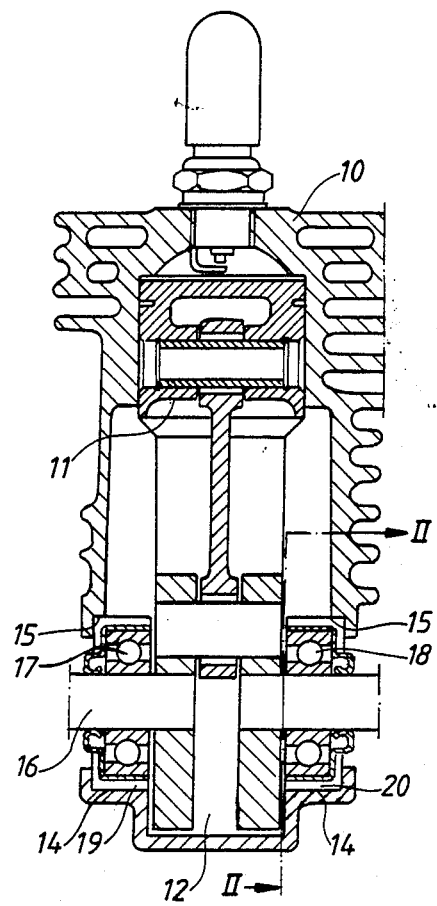
FIG. 1 is an engine with the said bearing sleeve in a vertical section.
Figure 2:
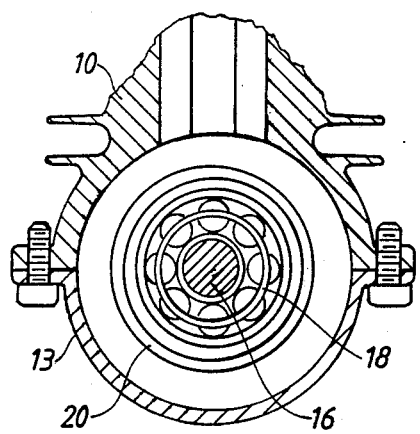
FIG. 2 is an enlarged picture of the bearing sleeve in the engine.

As illustrated in FIG. 1, the engine is a two-stroke engine with a cylinder 10, a piston 11, and a crankcase 12. Referring to FIG. 2, the cylinder is coupled with the crankcase by means of screws passing from below through holes in the lower crankcase half 13 and screwed in the cylinder 10. The lower crankcase half 13 has semi-cylindrical cavities 14 in its upper surface which fit with corresponding cavities 15 in the cylinder 10. A through crankshaft 16 is journalled in crankshaft bearings in the form of roller bearings 17, 18 in said cavities. Each roller bearing is surrounded by a sleeve 19, 20 pressed on the outer ring of the bearing before the crankshaft is mounted.

Figure 3:
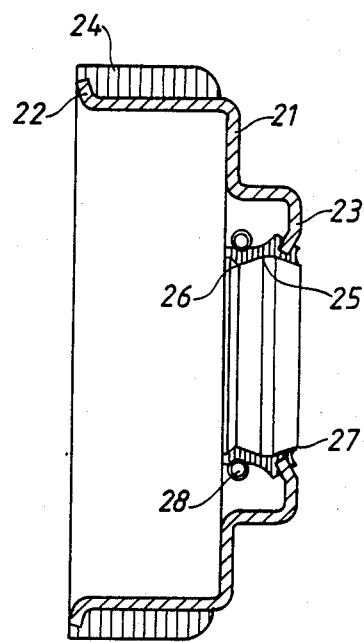
FIG. 3 is a vertical section of the bearing sleeve.

FIG. 3 shows in a vertical intersection view a bearing sleeve in detail. The body of the sleeve consists of a tin cup 21 having an outer ring 22 and an inner or interior ring 23 defining a center aperture or hole. The outer ring 22 has a coating 24 of elastomers such as rubber or plastic. The interior ring 23 supports a sealing ring 25 with edges formed as lips 26, 27 with good contact against the through crankshaft 16. Lip 26 prevents overpressure leakage from the crankcase and lip 27 prevents low pressure in the crankcase from equalizing. A ring-shaped screw spring 28 is applied on the outside of the lip 26 to support its contact against the crankshaft 16.

When the lower crankcase half 13 is mounted to the cylinder 10 and the mounting screws are tightened, the respective surfaces of the cylinder 10 and the lower crankcase half 13 seal against each other. The elasticity of the coating 24 contributes to filling up possible unevenness of the cavities when the screws are tightened so that an efficient seal around the bearing sleeves is obtained. The cavities can therefore be left unfinished, such as they appear after molding, since the tolerances already obtained are sufficient for fitting to the sleeve. Due to the sleeve, a uniform pressure around the outer bearing ring is also obtained and the latter is thus not deformed when the screws are tightened.

The elastic coating on the bearing sleeve results in smoother operation of the engine and thus less vibration and noise. The elastic support of the crankshaft also results in less risk of crankcase breakage.

Although the preferred embodiment of this invention has been shown and described, various modifications, replacements, and rearrangements of the parts may be effected without departing from the scope of the invention.

What is claimed is:

1. A bearing sleeve for the crankshaft of a two-stroke engine having a crankcase, crankcase compression, roller bearings (17, 18) in the crankcase end walls, and roller bearing seats (14, 15) for housing the roller bearings, said bearing sleeve comprising a ring-shaped part having an exterior surface and (22) forming a band around the roller bearings in one end wall, said ring-shaped part being fastened in the bearing seats (14, 15) of the crankcase end walls, wherein at least a portion of the exterior surface of said ring-shaped part is surrounded by an elastic material, and a disc-shaped part (21) of said bearing sleeve has a center hole (23) in which a sealing ring (25) is mounted so as to sealingly engage the crankshaft.

2. A bearing sleeve according to claim 1, wherein said sealing ring includes inwardly extending circular lips (26, 27) which are axially extending in opposite directions, said lips forming a seal around the crankshaft.

3. A bearing sleeve according to claim 2, wherein said disc-shaped part and said ring-shaped part are made in one piece so that said disc-shaped part forms a side wall of said sleeve outside the enclosed bearing.

4. A bearing sleeve according to claim 1, wherein said elastic material is an elastomer.

5. A bearing sleeve according to claim 1, wherein said elastic material is rubber.